United States Patent
Miles et al.

(10) Patent No.: US 11,697,173 B2
(45) Date of Patent: Jul. 11, 2023

(54) SYSTEMS AND METHODS FOR FRICTION BIT JOINING

(71) Applicants: Brigham Young University, Provo, UT (US); Mazak Corporation, Florence, KY (US)

(72) Inventors: Michael P. Miles, Springville, UT (US); Rodney Dale Fleck, Draper, UT (US); Russell J. Steel, Salem, UT (US); Kevin Alexander Shirley, Provo, UT (US); Shane Forrest Wood, Taylorsville, UT (US)

(73) Assignees: Brigham Young University, Provo, UT (US); Mazak Corporation, Florence, KY (US)

( * ) Notice: Subject to any disclaimer, the term of this patent is extended or adjusted under 35 U.S.C. 154(b) by 182 days.

(21) Appl. No.: 16/407,353

(22) Filed: May 9, 2019

(65) Prior Publication Data
US 2019/0344380 A1 Nov. 14, 2019

Related U.S. Application Data

(60) Provisional application No. 62/668,946, filed on May 9, 2018.

(51) Int. Cl.
*B23K 20/00* (2006.01)
*B23K 20/12* (2006.01)

(52) U.S. Cl.
CPC .................. *B23K 20/1255* (2013.01)

(58) Field of Classification Search
CPC .. B23K 20/12; B23K 20/122; B23K 20/1225; B23K 20/129; B23K 20/1295; B23K 20/1215; B23K 20/127; B23K 20/128; B23K 31/02; B23K 35/02; B23K 35/0255
See application file for complete search history.

(56) References Cited

U.S. PATENT DOCUMENTS

| | | |
|---|---|---|
| 4,544,313 A | 10/1985 | Grossberndt |
| 4,674,367 A | 6/1987 | Aab |
| 4,821,877 A | 4/1989 | Aab |
| 4,955,772 A | 9/1990 | Reck |
| 5,234,301 A | 8/1993 | Grossberndt |
| 5,361,478 A | 11/1994 | Grossberndt |
| 5,749,689 A | 5/1998 | Konig |

(Continued)

FOREIGN PATENT DOCUMENTS

| | | |
|---|---|---|
| CN | 101466492 B | 4/2012 |
| CN | 102500915 A | 6/2012 |

(Continued)

OTHER PUBLICATIONS

JP2004-074353 computer English translation (Year: 2021).*

(Continued)

*Primary Examiner* — Erin B Saad
(74) *Attorney, Agent, or Firm* — Fitch, Even, Tabin & Flannery LLP

(57) ABSTRACT

A tool for friction bit joining a workpiece material includes a bit with a tapered pin and a non-cutting tip. The bit has a top surface opposite the pin with at least one feature recessed in, or extending from, the top surface and configured to transmit torque to the bit to rotate the bit around a rotational axis.

21 Claims, 10 Drawing Sheets

(56) References Cited

U.S. PATENT DOCUMENTS

| | | |
|---|---|---|
| 5,772,376 A | 6/1998 | Gottfried |
| 5,882,161 A | 3/1999 | Birkelbach |
| 5,891,115 A | 4/1999 | Hauer |
| 6,059,502 A | 5/2000 | Konig |
| 6,113,331 A | 9/2000 | Grossberndt |
| 6,145,726 A | 11/2000 | Hoof |
| 6,158,939 A | 12/2000 | Grossberndt |
| 6,164,889 A | 12/2000 | Konig |
| 6,338,600 B2 | 1/2002 | Friederich |
| 6,340,277 B1 | 1/2002 | Koenig |
| 6,419,192 B1 | 7/2002 | Riecke |
| 6,540,462 B1 | 4/2003 | Bretschneider |
| 6,604,901 B1 | 8/2003 | Grossberndt |
| 6,648,206 B2 | 11/2003 | Nelson |
| 6,659,679 B2 | 12/2003 | Humm |
| 6,702,503 B2 | 3/2004 | Pinzl |
| 6,722,833 B2 | 4/2004 | Birkelbach |
| 6,732,901 B2 | 5/2004 | Nelson |
| 6,779,704 B2 | 8/2004 | Nelson |
| 6,846,142 B2 | 1/2005 | Gens |
| 6,863,483 B2 | 3/2005 | Koenig |
| 7,014,405 B2 | 3/2006 | Behle |
| 7,018,153 B2 | 3/2006 | Behle |
| 7,021,877 B2 | 4/2006 | Birkelbach |
| 7,124,929 B2 | 10/2006 | Nelson |
| 7,152,776 B2 | 12/2006 | Nelson |
| 7,210,885 B2 | 5/2007 | Pinzl |
| 7,225,968 B2 | 6/2007 | Packer |
| 7,247,099 B2 | 7/2007 | Friederich |
| 7,270,257 B2 | 9/2007 | Steel |
| 7,320,179 B2 | 1/2008 | Tiemann |
| 7,494,040 B2 | 2/2009 | Babb |
| 7,530,486 B2 | 5/2009 | Flak |
| 7,556,132 B2 | 7/2009 | Kornsteiner |
| 7,608,296 B2 | 10/2009 | Packer |
| 7,651,018 B2 | 1/2010 | Packer |
| 7,661,572 B2 | 2/2010 | Nelson |
| 7,753,252 B2 | 7/2010 | Taylor |
| 7,798,307 B2 | 9/2010 | Dubiel |
| 7,845,545 B2 | 12/2010 | Packer |
| 7,896,596 B2 | 3/2011 | Rausch |
| 7,909,231 B2 | 3/2011 | Babb |
| 7,992,759 B2 | 8/2011 | Steel |
| 7,993,575 B2 | 8/2011 | Nelson |
| 8,043,021 B2 | 10/2011 | Birkelbach |
| 8,047,740 B2 | 11/2011 | Christ |
| 8,056,797 B2 | 11/2011 | Packer |
| 8,092,130 B2 | 1/2012 | Christ |
| 8,132,993 B2 | 3/2012 | Koenig |
| 8,157,154 B2 | 4/2012 | Packer |
| 8,186,561 B2 | 5/2012 | Allen |
| 8,241,556 B2 | 8/2012 | Rosal |
| 8,250,823 B2 | 8/2012 | Tiemann |
| 8,277,923 B2 | 10/2012 | Christ |
| 8,302,834 B2 | 11/2012 | Nelson |
| 8,317,080 B2 | 11/2012 | Kingston |
| 8,348,572 B2 | 1/2013 | Friederich |
| 8,434,962 B2 | 5/2013 | Christ |
| 8,469,256 B2 | 6/2013 | Babb |
| 8,486,508 B2 | 7/2013 | Christ |
| 8,490,855 B2 | 7/2013 | Kingston |
| 8,545,152 B2 | 10/2013 | Kuenkel |
| 8,549,793 B1 | 10/2013 | Gens |
| 8,550,326 B2 | 10/2013 | Packer |
| 8,635,894 B2 | 1/2014 | Christ |
| 8,752,603 B2 | 6/2014 | Christ |
| 8,910,851 B2 | 12/2014 | Rosal |
| 8,955,734 B2 | 2/2015 | Steel |
| 9,061,370 B2 | 6/2015 | Nelson |
| 9,061,371 B2 | 6/2015 | Higgins |
| 9,109,619 B2 | 8/2015 | Pinzl |
| 9,140,306 B2 | 9/2015 | Kuenkel |
| 9,242,308 B2 | 1/2016 | Peterson |
| 9,340,848 B2 | 5/2016 | Pinzl |
| 9,352,425 B2 | 5/2016 | Rosal |
| 9,403,317 B2 | 8/2016 | Zebisch |
| 9,463,514 B2 | 10/2016 | Maiwald |
| 9,702,392 B2 | 7/2017 | Landsmann |
| 9,764,375 B2 | 9/2017 | Miles |
| 9,931,710 B2 | 4/2018 | Becker |
| 10,029,860 B2 | 7/2018 | Spindler |
| 10,160,068 B2 | 12/2018 | Maiwald |
| 10,273,681 B2 | 4/2019 | Lammer-Klupazek |
| 10,451,101 B2 | 10/2019 | Grotmann |
| 10,570,613 B2 | 2/2020 | Lammer-Klupazek |
| 10,710,193 B2 | 7/2020 | Werkmeister |
| 10,752,160 B2 | 8/2020 | Lauber |
| 10,792,866 B2 | 10/2020 | Becker |
| 10,875,251 B2 | 12/2020 | Kittel |
| 10,954,978 B2 | 3/2021 | Heinrich |
| 10,994,649 B2 | 5/2021 | Lauber |
| 11,008,751 B2 | 5/2021 | Dratschmidt |
| 11,020,818 B2 | 6/2021 | Brandau |
| 2002/0011510 A1* | 1/2002 | Enomoto ........... B23K 20/1255 228/112.1 |
| 2002/0125297 A1 | 9/2002 | Stol |
| 2003/0075584 A1 | 4/2003 | Sarik |
| 2003/0136810 A1 | 7/2003 | Stevenson |
| 2005/0006439 A1 | 1/2005 | Packer |
| 2005/0051602 A1 | 3/2005 | Babb |
| 2005/0142005 A1 | 6/2005 | Traylor |
| 2006/0032333 A1 | 2/2006 | Steel |
| 2006/0032891 A1 | 2/2006 | Flak |
| 2006/0049234 A1 | 3/2006 | Flak |
| 2006/0157531 A1 | 7/2006 | Packer |
| 2006/0175382 A1 | 8/2006 | Packer |
| 2007/0187465 A1 | 8/2007 | Eyre |
| 2008/0029578 A1 | 2/2008 | Steel |
| 2009/0095759 A1 | 4/2009 | Kelly |
| 2009/0294514 A1 | 12/2009 | Babb |
| 2010/0071961 A1 | 3/2010 | Steel |
| 2010/0078224 A1 | 4/2010 | Steel |
| 2011/0127311 A1 | 6/2011 | Peterson |
| 2011/0172802 A1 | 7/2011 | Babb |
| 2012/0055977 A1 | 3/2012 | Steel |
| 2012/0227546 A1 | 9/2012 | Allen |
| 2012/0273555 A1 | 11/2012 | Flak |
| 2013/0062395 A1 | 3/2013 | Nelson |
| 2013/0206818 A1 | 8/2013 | Higgins |
| 2013/0228612 A1 | 9/2013 | Higgins |
| 2013/0299561 A1 | 11/2013 | Higgins |
| 2014/0008418 A1 | 1/2014 | Steel |
| 2014/0151438 A1 | 6/2014 | Fleck |
| 2015/0258628 A1 | 9/2015 | Flak |
| 2017/0197274 A1 | 7/2017 | Steel |
| 2017/0216961 A1 | 8/2017 | Utter |
| 2017/0274472 A1* | 9/2017 | Maruko ........... B23K 20/1255 |
| 2018/0021883 A1 | 1/2018 | Werkmeister |
| 2018/0099349 A1 | 4/2018 | Packer |
| 2019/0061046 A1 | 2/2019 | Fleck |
| 2019/0061048 A1 | 2/2019 | Fleck |
| 2019/0151982 A1 | 5/2019 | Rosal |

FOREIGN PATENT DOCUMENTS

| | | | |
|---|---|---|---|
| CN | 203711941 U | | 7/2014 |
| CN | 105579182 A | | 5/2016 |
| CN | 105750725 | | 7/2016 |
| CN | 106112543 A | | 11/2016 |
| CN | 107771110 A | | 3/2018 |
| CN | 208879773 U | | 5/2019 |
| DE | 102009006775 | | 10/2009 |
| DE | 102015202074 | | 8/2016 |
| JP | H10230372 A | | 9/1998 |
| JP | 2004074353 A | * | 3/2004 |
| JP | 2015139788 | | 8/2015 |
| JP | 2015139788 A | | 8/2015 |

OTHER PUBLICATIONS

JP2015139788 computer English translation (Year: 2021).*
Werkmeister et al. (CN107771110 A1) computer translation (Year: 2022).*

(56) References Cited

OTHER PUBLICATIONS

U.S. Appl. No. 11/821,790, filed Jun. 25, 2007, Packer Scott M.
U.S. Appl. No. 12/392,030, filed Feb. 24, 2009, Babb Jonathan A.
U.S. Appl. No. 16/401,907, filed May 2, 2019, Liu Qingyuan.
U.S. Appl. No. 60/573,703, filed May 24, 2014, 6 pages.
Extended European Search Report issued in corresponding European Patent Application No. 19173459.9, dated Nov. 20, 2019, 8 pages.
Machine translation of First Office Action and Search Report issued in corresponding Chinese Patent Application No. 201910382643.X, dated Dec. 16, 2021.
Second Office Action with machine translation issued in corresponding Chinese Patent Application No. 201910382643.X dated Jul. 15, 2022, 16 pages.
Office Action with English translation issued in corresponding Japanese Patent Application No. 2019-088987 dated Jan. 5, 2023, 8 pages.
Third Office Action issued in corresponding Chinese Patent Application No. 201910382643.X dated Jan. 3, 2023, 7 pages.
Office Action issued in corresponding Chinese Patent Application No. 201910382643.X dated May 9, 2023, 9 pages.

\* cited by examiner

SYSTEMS AND METHODS FOR FRICTION BIT JOINING

CROSS-REFERENCE TO RELATED APPLICATION

This application claims the benefit of U.S. Provisional Application No. 62/668,946, filed May 9, 2018, which is hereby incorporated by reference in its entirety.

BACKGROUND

Friction stir processing ("FSP") of metals has been used to attach weldable materials to one another in a solid state joining process. FSP uses the motion of a pin pressed against the surface of a weldable material to generate heat and friction to move the weldable material. The material can plasticize and physically stir together with a second material to which the first material is joined. A pin, a pin and shoulder, or another "FSP tool" may be rotated in contact with a workpiece. A force is applied to the FSP tip to urge the FSP tool against the workpiece. The FSP tool is moved along the workpiece to stir the material of the workpiece. The physical process of mixing material from two plates joins the plates.

FSP joins weldable materials in a solid-state process that avoids many of the potential defects of other welding processes. For example, FSP produces a stirred region along the path of the tool that is generally indistinguishable from the original material. FSP may be performed without the inclusion of an additional material or use of shield gasses. Some welding methods, such as metal-inert gas ("MIG") welding, may introduce an additional material to create a bond. Other welding methods, such as tungsten-inert gas ("TIG") welding, may use a non-consumable contact point to heat one or more workpieces. However, the heating may cause the one or more workpieces to attain a liquid phase and risk a phase change in the one or more workpieces. A phase change may compromise the integrity of the bond and, potentially, the workpiece, itself. To limit the possibility of a phase change or other reaction, TIG welding and similar processes utilize an inert gas "shield" around the contact area.

Conventional FSP uses a non-consumable bit and leaves a void when the FSP tool is retracted from the workpiece. Friction bit joining (FBJ) uses a consumable bit that is consumed by the FBJ process and become an integral part of the joint produced. A FBJ joint typically requires at least one finishing step and sometimes more to produce a finished surface.

SUMMARY

In some embodiments, a tool for friction bit joining a workpiece material includes a bit with a pin that is tapered and has a non-cutting tip. The bit has a top surface opposite the pin with at least one feature recessed in the top surface configured to transmit torque to the bit to rotate the bit around a rotational axis.

In some embodiments, a tool for friction bit joining includes a bit and a driver. The driver has a driver body rotatable around a rotational axis and at least one mechanical interlocking feature protruding from the driver body. The bit has a top surface opposite the pin with at least one complementary interlocking feature recessed in the top surface configured to transmit torque to the bit to rotate the bit around the rotational axis.

In some embodiments, a method of friction bit joining a workpiece includes rotating a driver around a rotational axis and rotating a bit in contact with the workpiece using the driver. The method further includes moving the bit axially into the workpiece and displacing workpiece material. The method continues by friction stirring the workpiece material with the bit with a top surface of the bit flush with a workpiece surface and then stopping the bit in the workpiece and disconnecting the bit from the driver such that the bit remains in the workpiece.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, other drawings should be considered as drawn to scale for example embodiments. Understanding that the drawings depict some example embodiments, the embodiments will be described and explained with additional specificity and detail through the use of the accompanying drawings in which:

FIG. 3-1 is a perspective view of a friction bit joining system welding a lap joint, according to some embodiments of the present disclosure;

FIG. 3-2 is a side cross-sectional view of the embodiment of a lap joint illustrated in FIG. 3-1;

DETAILED DESCRIPTION

This disclosure generally relates to devices, systems, and methods for increasing efficiency of a friction bit joining (FBJ) tool for friction stir welding, joining, processing, or other friction stirring procedures. More specifically, some of the embodiments described herein relate to the design, manufacture, and use of FBJ tools that produce a near-finished surface during the FBJ process. For example, a FBJ tool may be used to friction stir one or more workpieces and consume the FBJ bit in the joint while leaving a surface that is flush with the original workpiece surface and free of flash or other debris without the need for subsequent machine or finishing procedures.

In some embodiments, a FBJ tool according to the present disclosure includes a FBJ bit and a FBJ driver. The FBJ bit may be rotated by the driver through a mechanical interlock between the FBJ bit and driver to friction stir a workpiece or workpieces. The FBJ bit may, subsequently, remain in the joint with a surface of the FBJ bit flush with a surface of the workpiece when the driver is retracted.

In some embodiments, the FBJ bit has a conical (including frusto-conical), curved, or other non-cutting tip. The tip of the FBJ bit may be plunged into a workpiece with an axial force that displaces workpiece material from the stirred region of the workpiece and/or joint. In some embodiments, a driver of the FBJ tool includes one or more cutting elements to cut or otherwise remove flash from the surface of the workpiece around the stirred region. In other embodiments, the driver includes one or more burnishers to compress and/or burnish a surface of the workpiece around the stirred region.

In some embodiments, the penetration of the FBJ bit by displacement of workpiece material instead of cutting into the workpiece material may produce greater amounts of movement of the workpiece material. In some examples, the FBJ tool may produce thermal energy upon displacement in addition to the rotation of the FBJ tool in contact with the workpiece. The FBJ tool may then frictionally drag the workpiece material to flow the workpiece material in substantially circular motion with the rotation of the FSP tool work surface. In other examples, the FBJ tool includes one or more surface features on a pin and/or a shoulder that mechanically engage with the workpiece material to flow the workpiece material. The increased flow rate may produce a stronger weld and/or allow increased translational speeds across the workpiece surface to complete a weld in less time.

Figure 1:
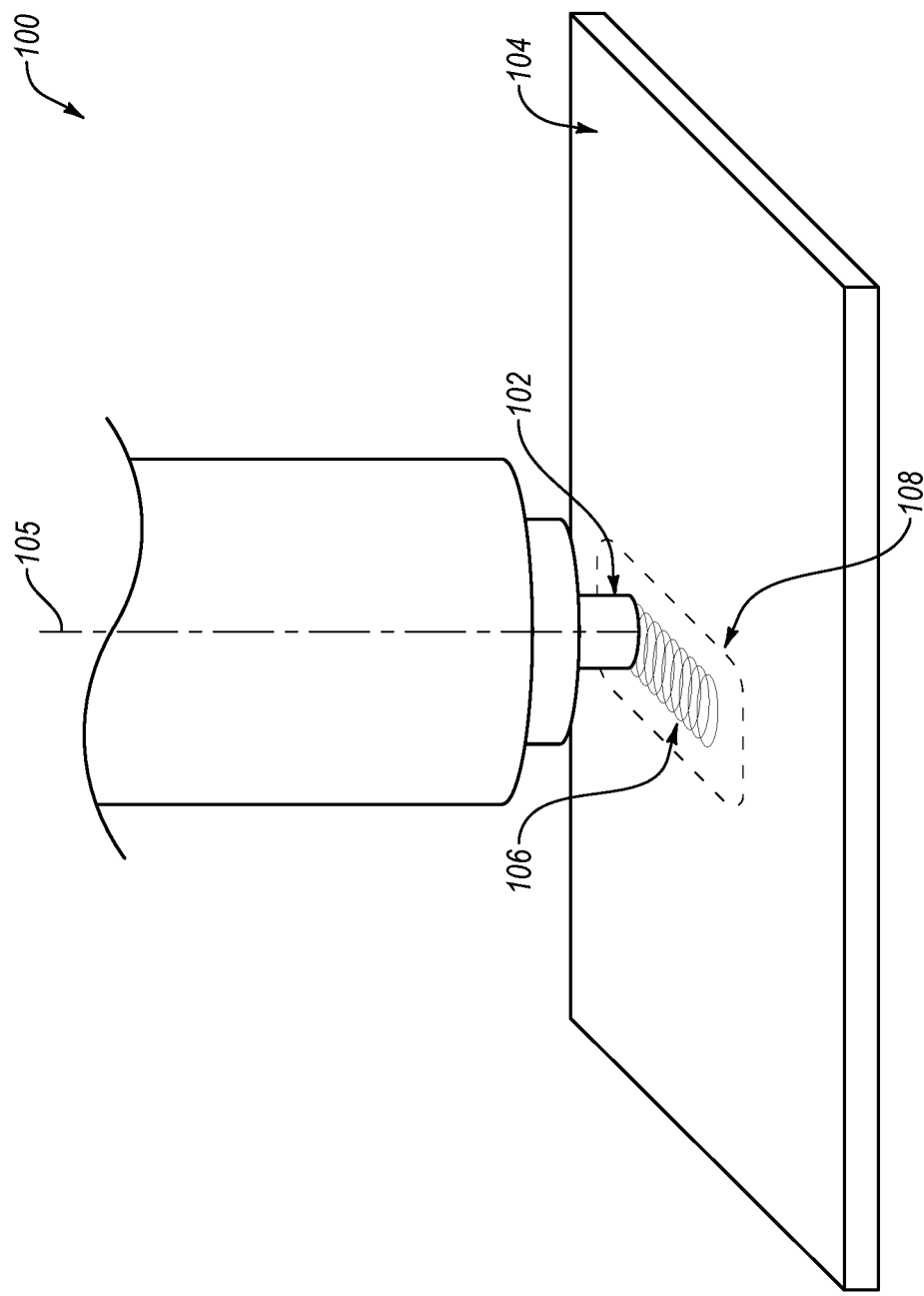
FIG. 1 is a perspective view of a friction bit joining system, according to some embodiments of the present disclosure.

FIG. 1 illustrates an embodiment of a FBJ system 100 with a FBJ tool 102 in contact with a workpiece 104. Rotation of the FBJ tool 102 around a rotational axis 105 in contact with the workpiece 104 may stir the workpiece 104 in a stirred zone 106 and create a heat affected zone 108 beyond the stirred zone 106. In some embodiments, FBJ stirs a workpiece 104 to refine the grain structure in the stirred zone 106 and/or the heat affected zone 108 of the workpiece material with a consumable FBJ bit. For example, the crystalline structural of the workpiece material may be at least partially dependent on the manufacturing of the workpiece. The as-manufactured grain structure may be undesirable for a finished part. While FBJ is may be used to join a plurality of workpieces, a consumable bit may be used with friction stir processing (FSP) of workpieces.

In some examples, a cast workpiece has a random orientation (i.e., no texture) with a relatively large grain size with little to no deformation within each grain. FSP of the cast aluminum may refine the grain size to produce a smaller average grain size (increasing the boundary density of the microstructure). FSP of the cast aluminum may further produce internal strain within the grains. Increases in one or both of the grain boundary density and the internal strain may increase the hardness of the aluminum.

In other examples, an extruded or rolled workpiece exhibits a preferred orientation to the grain structure (e.g., a <101> texture or a <001> texture, respectively in aluminum) that may be undesirable in the finished part. For example, an extruded texture in an aluminum rod may increase the mechanical wear rate of the aluminum when used as an axle. FSP of the aluminum may mechanically alter the grain structure of the aluminum rod and/or remove the extruded texture of the rod surface. Orientation textures may affect other mechanical or chemical properties of the workpiece, such as anisotropic hardness or toughness, or oxidation rates.

Figure 2:
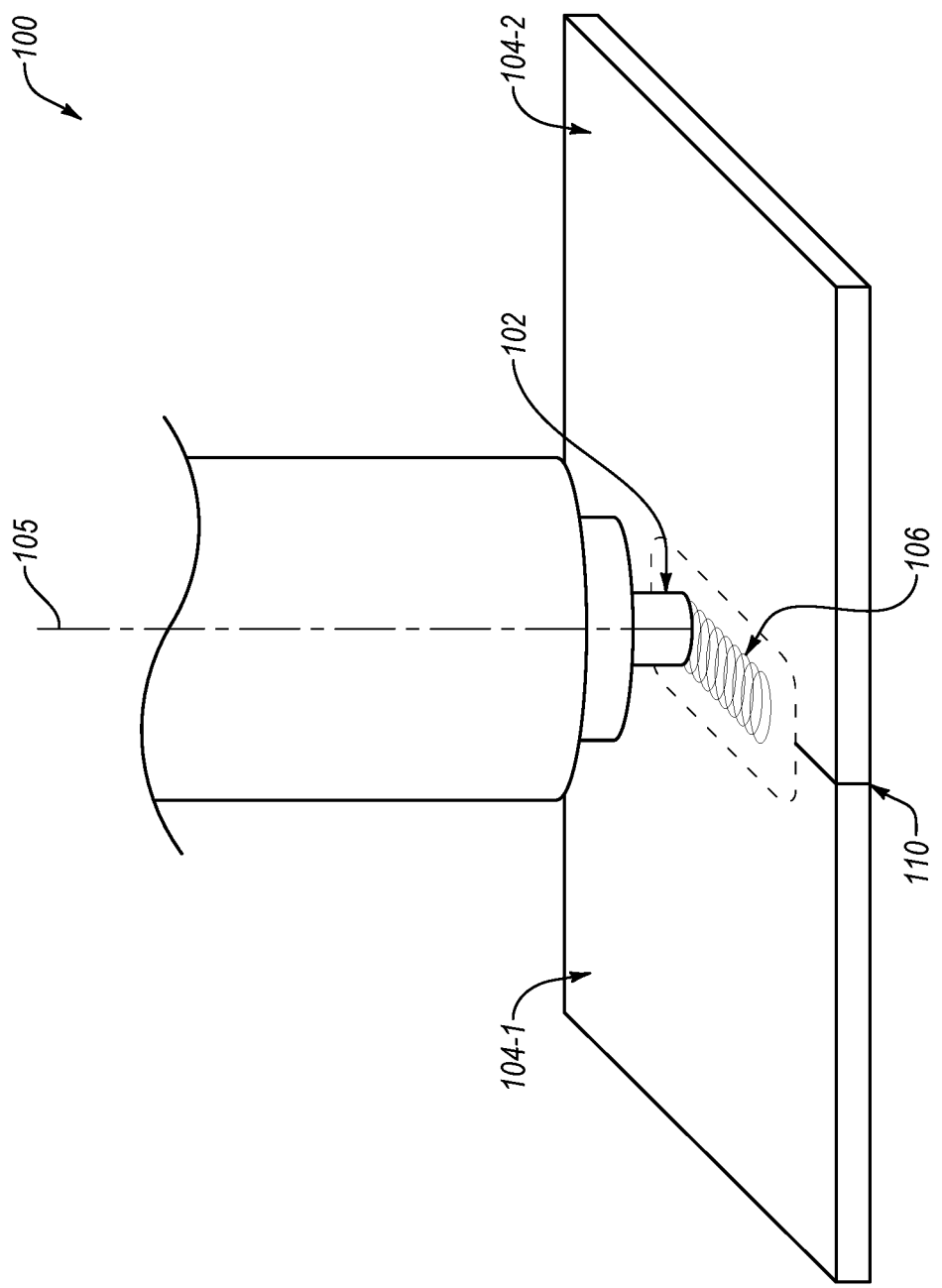
FIG. 2 is a is a perspective view of a friction bit joining system welding a butt joint, according to some embodiments of the present disclosure.

In other embodiments, FBJ refers to friction stir welding of a first workpiece to a second workpiece. For example, FIG. 2 illustrates the FBJ system 100 and FBJ tool of FIG. 1 stir welding a butt joint. A first workpiece 104-1 may be positioned contacting a second workpiece 104-2 in a butt joint 110, and the first workpiece 104-1 and second workpiece 104-2 may be joined along the butt joint 110 by FBJ. The FBJ tool 102 may flow first workpiece material and second workpiece material in a circular direction and perpendicular to the butt joint 110 in the stirred zone 106 to transfer material between the first workpiece 104-1 and second workpiece 104-2, mechanically joining the first workpiece 104-1 and second workpiece 104-2 along the butt joint 110.

Stir welding is a solid state joining process that plastically moves material of the first workpiece 104-1 and second workpiece 104-2 to interlock the first workpiece 104-1 and second workpiece 104-2 at a microstructural level. In some embodiments, the first workpiece 104-1 and second workpiece 104-2 are the same material. For example, the first workpiece 104-1 and the second workpiece 104-2 may be both a AA 6065 aluminum alloy. In other embodiments, the first workpiece 104-1 and second workpiece 104-2 are different materials. For example, the first workpiece 104-1 may be a single-phase aluminum alloy, and the second workpiece 104-2 may be a single-phase copper alloy. In other examples, the first workpiece 104-1 is an AA 6063 aluminum alloy and the second workpiece 104-2 is an AA 7075 aluminum alloy.

Figures 1, 3:
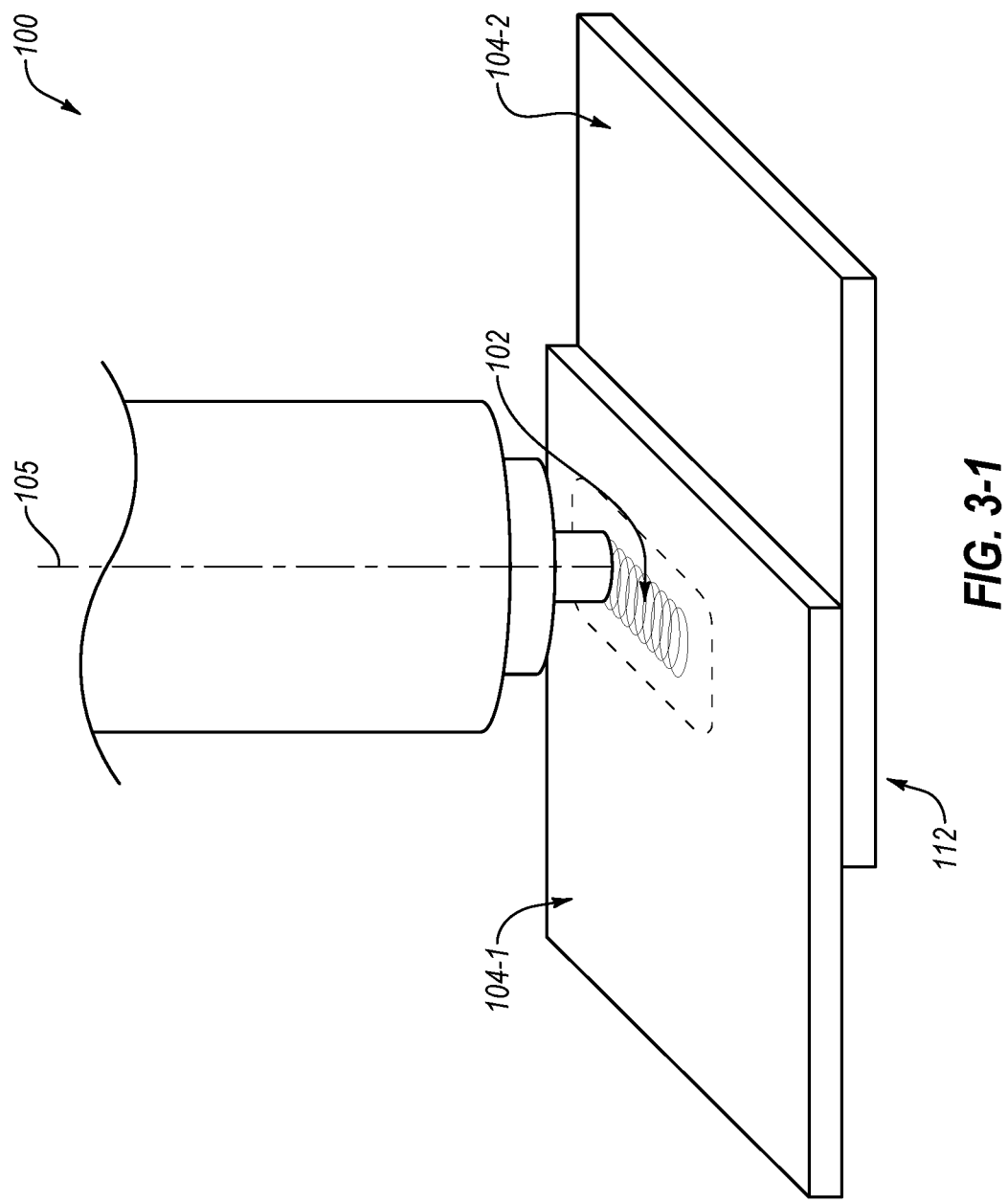
Figures 2, 3:
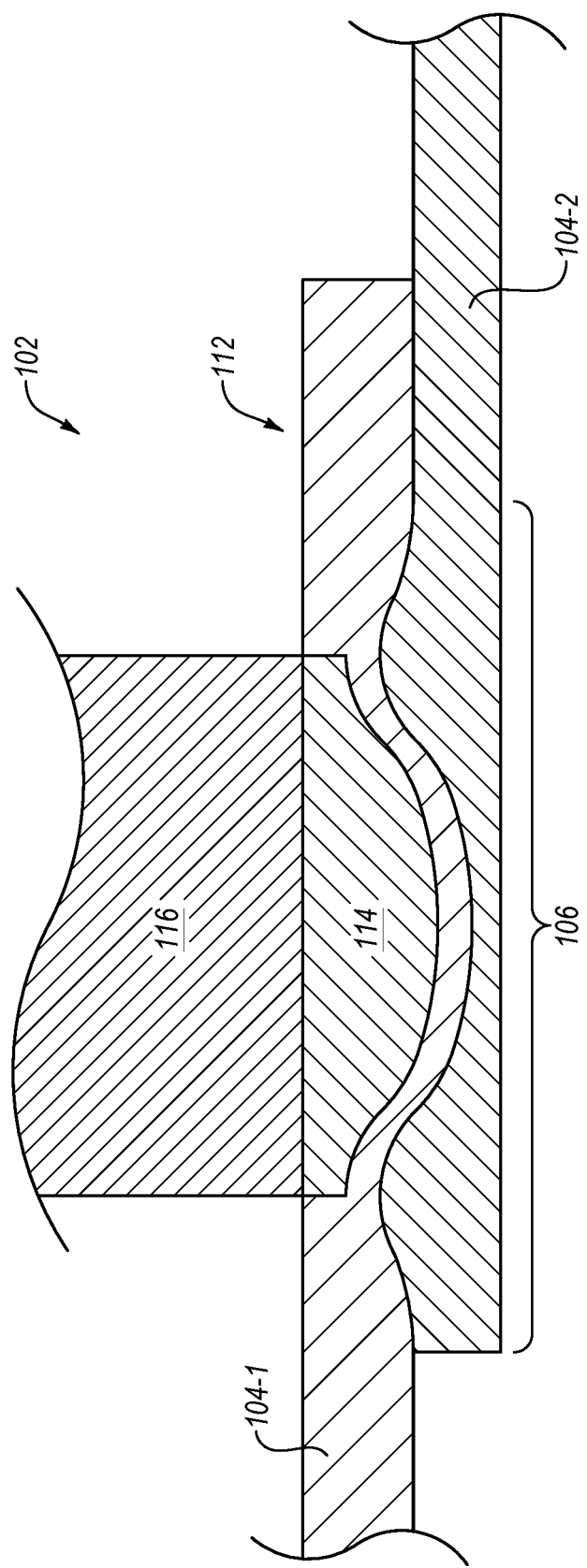

In yet another embodiment, stir welding by FBJ includes friction stirring of a first workpiece and a second workpiece adjacent one another in a lap joint, such as the embodiment illustrated in FIG. 3-1. The FBJ tool 102 may be positioned contacting a surface of the first workpiece 104-1 and the FBJ tool 102 may be plunged into the first workpiece 104-1 and, optionally, the second workpiece 104-2 to plastically move first workpiece material and second workpiece material to interlock the first workpiece 104-1 and the second workpiece 104-2 at the lap joint 112.

In some embodiments, a lap joint 111 weld by FBJ may require greater axial loads than a butt joint weld. The increased axial load may generate greater thermal energy and greater flow of material when a non-cutting FBJ bit is used to displace workpiece material. For example, FIG. 3-2 is a side cross-sectional view of the lap joint 112 of FIG. 3-1.

Figure 4:
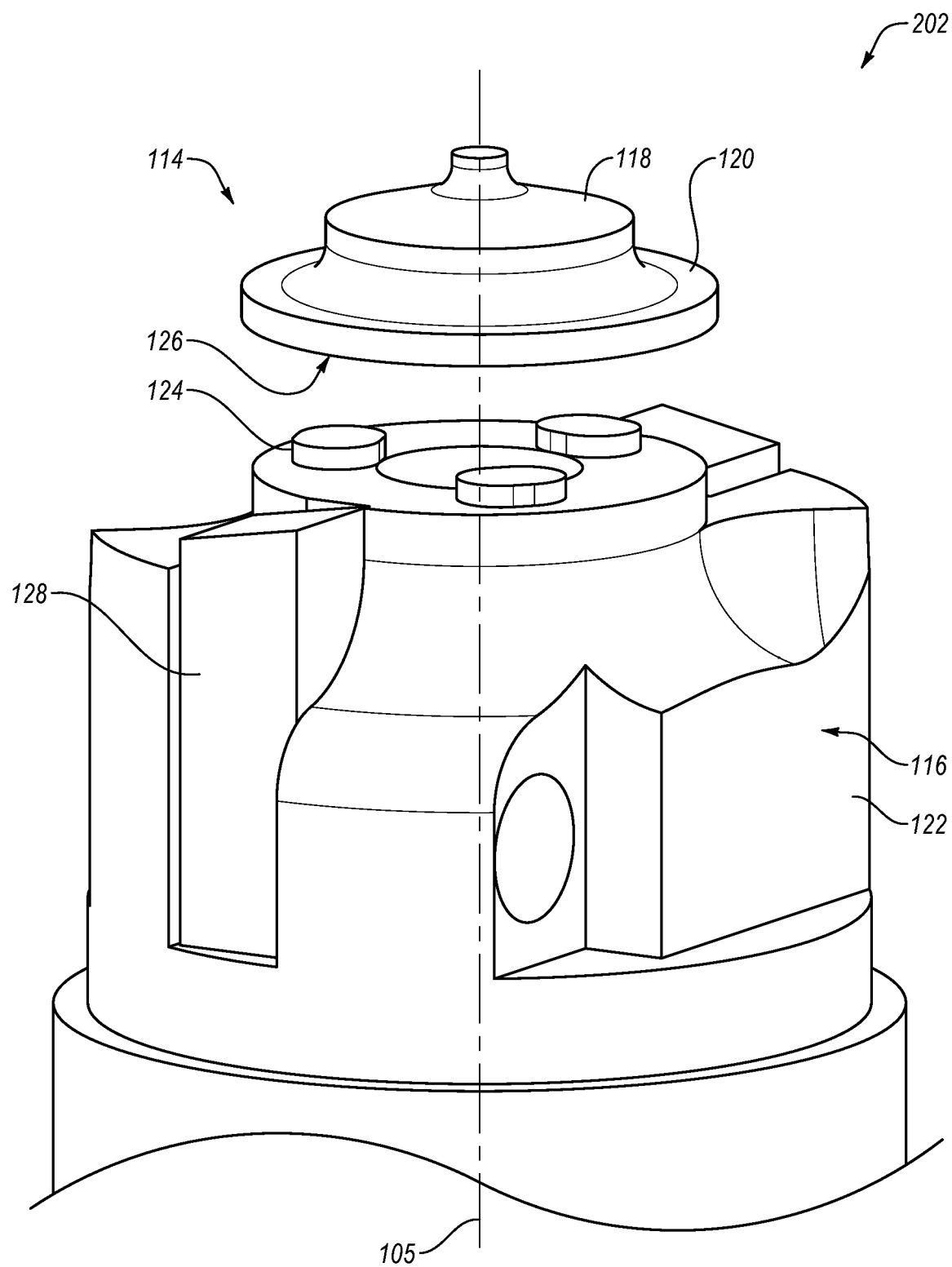
FIG. 4 is a perspective exploded view of the embodiment of a friction bit joining tool of FIG. 3-1.

FIG. 4 is a side cross-sectional view of an embodiment of a FBJ tool 102, according to the present disclosure. In some embodiments, the FBJ tool 102 has a bit 114 coupled to a driver 116. The bit 114 may be rotationally fixed relative to the driver 116, such that rotation of the driver 116 by a FBJ system 100 may rotate the FBJ bit 114. In other embodiments, the bit 114 is axially fixed relative to the driver 116, such that axial movement of the driver 116 produces axial movement of the bit 114. For example, the bit 114 may be axially fixed to the driver 116 up to a threshold force. Exceeding the threshold force may disconnect the bit 114 from the driver 116. The threshold force may allow the bit 114 to move with the driver 116 to position the FBJ tool 102, and the subsequently for the bit 114 to be left in the workpiece(s) upon completion of the weld. In some embodiments, the threshold force is greater than 0.5 lbs. (2.22 N). In other embodiments, the threshold force is greater than 1.0 lbs. (4.45 N). In yet other embodiments, the threshold force is greater than 5.0 pounds (22.24 N).

The threshold force may be the force needed to separate the bit 114 and driver 116, while the axial compression force downward toward the workpieces 104-1, 104-2 may be in a range having an upper value, a lower value, or upper and lower values including any of 1,000 lbs. (4.45 kN), 2,000 lbs. (8.90 kN), 4,000 lbs. (17.8 kN), 6,000 lbs. (26.7 kN), 8,000 lbs. (35.6 kN), 10,000 lbs. (44.5 kN), 15,000 lbs. (66.8 kN), 20,000 lbs. (89.0 kN), greater than 20,000 lbs. (89.0 kN), or any values therebetween. For example, the axial force may be greater than 1,000 lbs. (4.45 kN). In other examples, the axial force may be less than 20,000 lbs. (89.0 kN). In yet other examples, the axial force may be between 1,000 lbs. (4.45 kN) and 20,000 lbs. (89.0 kN). In further examples, the axial force may be between 1,000 lbs. (4.45 kN) and 10,000 lbs. (44.5 kN). In at least one example, the axial force may be between 3,750 lbs. (16.7 kN) and 4,250 lbs. (18.9 kN), and in a particular embodiment is 4,000 lbs. (17.8 kN).

In some embodiments, the bit 114 includes or is made of a ferrous alloy, such as tool steel, a nickel alloy (e.g., a nickel superalloy), an aluminum alloy (e.g., AA 6065), or any other material that is metallurgically compatible with the workpiece to which the FBJ bit 114 is intended to bond. For example, the bit 114 may be metallurgically compatible with both workpieces 104-1, 104-2 in a butt joint. In other examples, the bit 114 is metallurgically compatible with the bottom workpiece (i.e., the second workpiece 104-2) in a lap joint 112. In some embodiments, the bit 114 has one or more coatings to improve the metallurgical compatibility of the bit 114 and the workpiece(s) 104-1, 104-2. In other embodiments, the bit 114 has one or more coatings to improve the erosion and/or wear resistance of the bit 114. In yet other embodiments, the bit 114 has one or more coatings to improve the corrosion resistance of the bit 114.

In some embodiments, the displacement of workpiece material from the workpieces 104-1, 104-2 at the lap joint 112 disturbs and flow workpiece material within the stirred zone 106 even before any rotation of the bit 114 and stirring of the workpiece material. Hence, penetration of the bit 114 by displacement, in contrast to cutting, may allow for greater total movement of workpiece material, increasing the homogeneity and strength of the resulting welds.

The threshold force may be at least partially related to an attachment mechanism of the bit 114 to the driver 116. For example, FIG. 4 is an exploded perspective view of the embodiment of a bit 114 and driver 116 of FIG. 3-1 showing an attachment mechanism therebetween.

In some embodiments, a bit 114 is configured to rotate about a rotational axis 105 to move workpiece material. The bit 114 may have a pin 118 and a shoulder 120. For example, the pin 118 may facilitate penetration into the workpiece material and subsequent stirring of the workpiece material. The shoulder 120 may be wider than the pin 118 and may contain the workpiece material displaced by the pin 118 and further facilitate stirring of the workpiece material. In other embodiments, the bit 114 has a pin 118 but lacks a shoulder 120.

The driver 116 may include a driver body 122 and one or more mechanical interlocking features 124 that allow the driver 116 to interlock and engage with complementary interlocking features 126 on the bit 114. For example, the mechanical interlocking features 124 may be protrusions or posts that engage with recesses or other complementary interlocking features 126 on the bit 114. In other examples, the complementary interlocking features 126 on the bit 114 are protrusions or posts that engage with recesses or other mechanical interlocking features 124 on the driver 116. In embodiments with protrusions or other raised complementary interlocking features 126 on the bit 114, an extra finishing step may be performed to remove the raised complementary interlocking features 126 and create a planar surface after the FBJ process is complete.

In some embodiments, the driver 116 includes cutters 128 to remove flash or other debris during the FBJ process. For example, the cutters 128 may be coupled to the driver body 122 such that the cutters rotate about the rotational axis 105 as the driver 116 turns. The cutters 128 may be positioned to cut material from the workpiece and produce a substantially flat surface after FBJ. In other embodiments, the FBJ system includes an evacuation and/or collection system for the cuttings produced by the cutters 128 removing flash or other workpiece material. For example, the evacuation and/or collection system may include a vacuum system and/or a waste collection bin to collect and ease disposal or reuse of the cuttings.

In other embodiments, the cutters 128 are used to determine a depth of penetration of the bit 114 into a workpiece. For example, the driver 116 may cease axial movement, and the associated axial penetration of the bit 114, when the cutters 128 contact that workpiece surface. In other examples, a cutting edge of the cutter 128 is positioned axially even with a top surface of the bit 114 to limit penetration of the bit 114 and driver 116 into the workpiece material. In other embodiments, the driver body 122 supports one or more burnishers, polishers, or smoothing elements that do not cut, but otherwise contact a surface of the workpiece as the driver 116 rotates about the rotational axis 105. In some examples, the burnishers or smoothing elements are used to determine a depth of penetration of the bit 114 into a workpiece.

Figure 5:
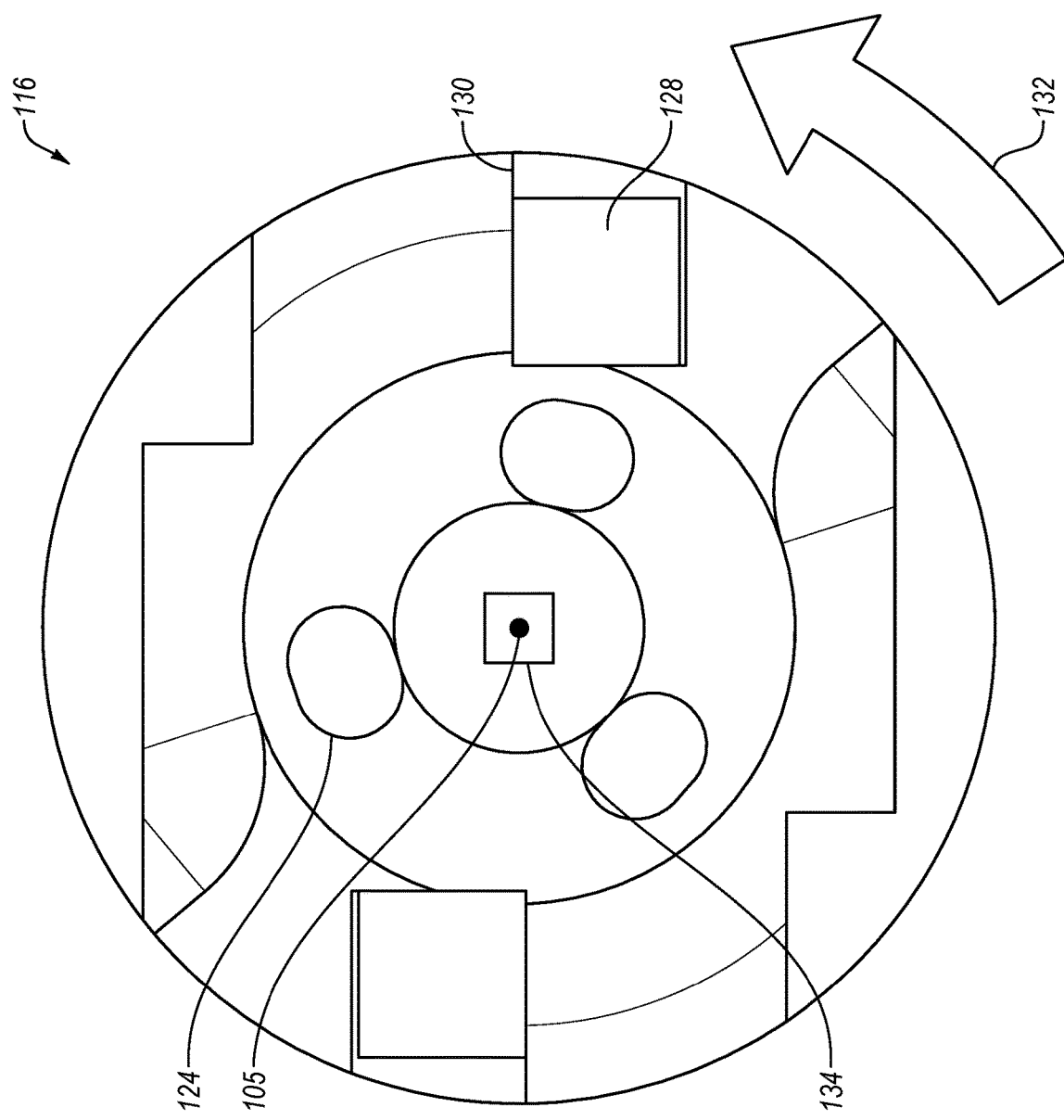
FIG. 5 is an end view of the embodiment of a friction bit driver of FIG. 3-1.

FIG. 5 is an end view of embodiment of a driver 116 of FIG. 4. As described in relation to FIG. 4, the driver 116 may include a plurality of mechanical interlocking features 124. In some embodiments, the mechanical interlocking features 124 are positioned at angular intervals around the rotational axis 105. For example, the mechanical interlocking features 124 may be positioned at equal angular intervals around the rotational axis. In some examples, a driver 116 with three mechanical interlocking features 124 has the mechanical interlocking features 124 positioned at 120° angular intervals. A driver 116 with two mechanical interlocking features 124 may have the mechanical interlocking features 124 positioned at 180° intervals. In other examples, the driver 116 has 4, 5, 6, 7, 8, or more mechanical interlocking features 124.

In other embodiments, the driver 116 has mechanical interlocking features 124 that are positioned at unequal intervals. For example, a driver 116 with three mechanical interlocking features 124 may have the mechanical interlocking features 124 positioned at 110°, 120°, and 130°, angular intervals from one another. A driver 116 with two mechanical interlocking features 124 may have the mechanical interlocking features 124 positioned at 170° and 190° intervals.

As described in relation to FIG. 4, the driver 116 may include a plurality of cutters 128 oriented in the rotational direction 132 of the driver 116. The cutters 128 may include or be made of hard materials, such as tool steel or cobalt-chromium alloys; a carbide, such as tungsten carbide; other superhard materials, such as diamond or polycrystalline cubic boron nitride; or other materials.

In some embodiments, the cutters 128 are positioned at regular angular intervals around the rotational axis 105. For example, the cutters 128 may be positioned at equal angular intervals around the rotational axis. In some examples, a driver 116 with three cutters 128 has the cutters 128 positioned at 120° angular intervals. A driver 116 with two cutters 128 may have the cutters 128 positioned at 180° intervals. In other examples, the driver 116 has 4, 5, 6, 7, 8, or more cutters 128.

In other embodiments, the driver 116 has cutters 128 that are positioned at unequal intervals. For example, a driver 116 with three cutters 128 may have the cutters 128 positioned at 110°, 120°, and 130° angular intervals from one another, or at 110°, 110°, 140° angular intervals from one another. A driver 116 with two cutters 128 may have the cutters 128 positioned at 170° and 190° intervals or at 150° and 210° intervals.

Figure 6:
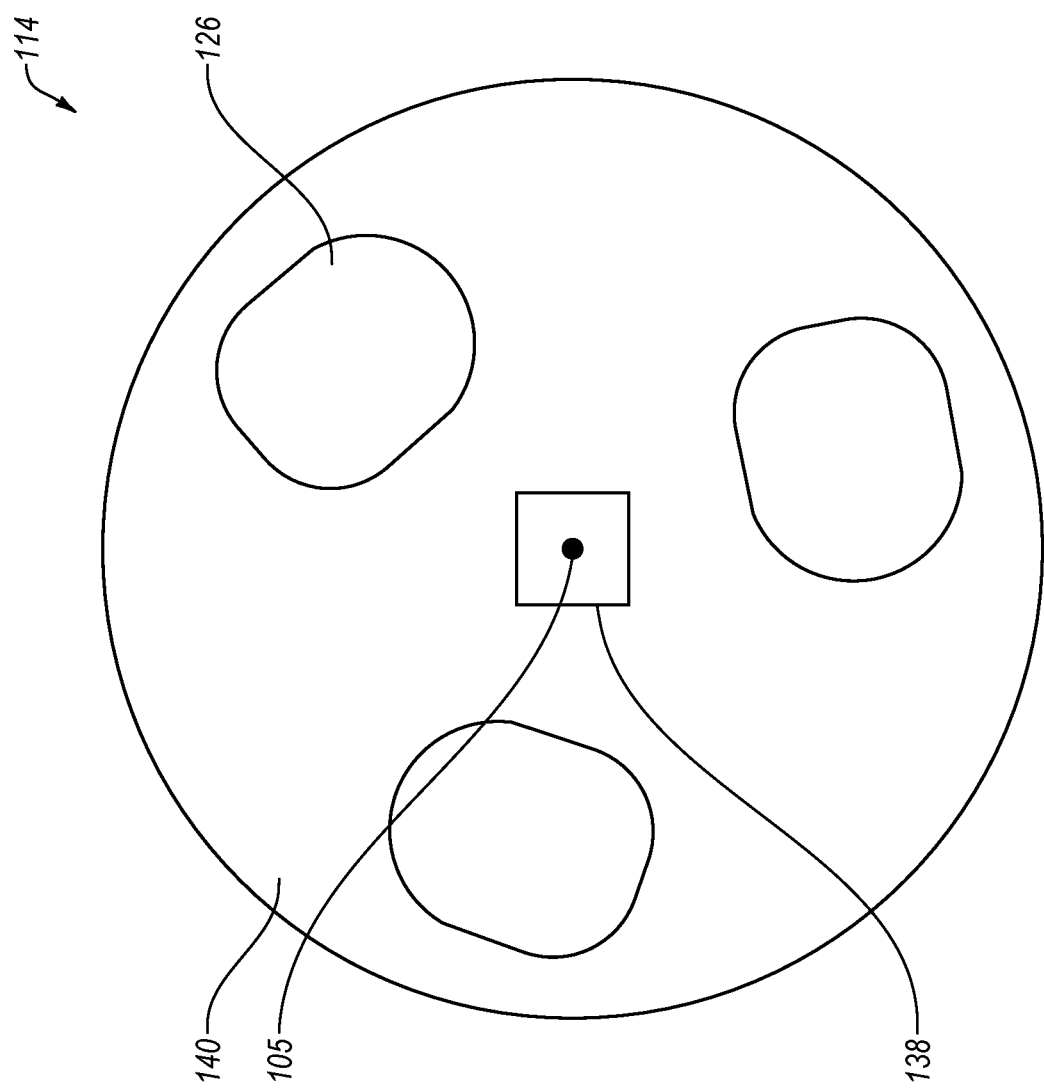
FIG. 6 is an end view of the embodiment of a friction bit of FIG. 3-1.

In some embodiments, the mechanical interlocking features 124 has a friction fit with the complementary interlocking features 126 of the bit 114, shown in FIG. 6, in addition to transmitting torque from the driver 116 to the bit 114. In some embodiments, the axial connection of the bit 114 and the driver 116 is at least partially due to the friction fit between one or more of the mechanical interlocking features 124 and the complementary interlocking features 126. In other embodiments, the driver 116 includes a retention mechanism to retain the bit 114 against the driver 116. For example, the driver 116 may include a magnet 134 in the driver 116 that applies a magnetic force to the bit 114 to retain the bit 114 against the driver 116 and engaged with the mechanical interlocking features 124. In other embodiments, the magnet 134 is an electromagnet that may be disabled to release the bit 114 in the axial direction. In the same or yet other embodiments, a magnet 134 is thermally insulated to protect the magnet 134 from thermal damage during the FBJ process. In further embodiments, the retention mechanism includes a vacuum retention system that retains the bit 114 against the driver 116.

FIG. 6 is a top view of the embodiment of a bit 114 of FIG. 4 facing a top surface 140 opposite the pin illustrated in FIG. 4. The bit 114 may be configured to rotate about the rotational axis 105. As such, the complementary interlocking features 126 may be positioned at angular intervals around the rotational axis 105. The angular positions of the complementary interlocking features 126 may be selected to match the positions of the mechanical interlocking features of the driver, as describe in relation to FIG. 5.

In some embodiments, a bit 114 includes a magnet 138 that is positioned to apply a magnetic force to the driver to retain the bit 114 on the driver. In other embodiments, a bit 114 has no magnet, but includes or is made of a magnetic (such as ferromagnetic) material. A magnet positioned on the driver may apply a magnetic field to the bit 114, producing a magnetic force that retains the bit 114 on the driver 116. In embodiments, with a magnet 138, the magnet 138 may be flush with a top surface 140 of the bit 114, such that the bit 114 presents a flat top surface 140 when consumed in a joint during the FBJ process.

Figure 7:
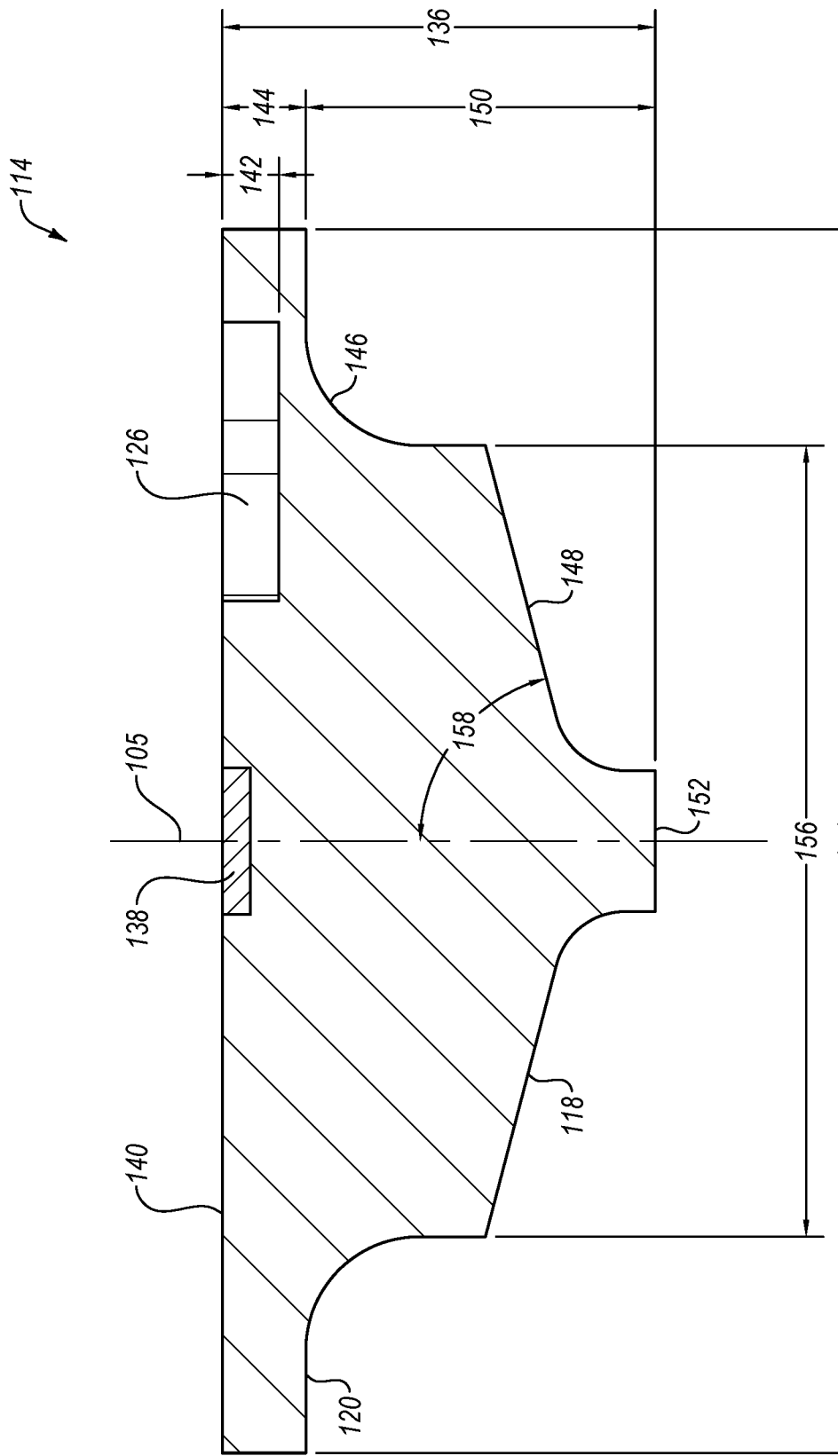
FIG. 7 is a side cross-sectional view of the embodiment of a friction bit of FIG. 3-1.

The magnet 138 and complementary interlocking features 126 of the bit 114 are illustrated in a side cross-sectional view of the bit 114 in FIG. 7. The complementary interlocking features 126 may have an interlock depth 142 from the top surface 140 that is relative to a shoulder height 144 of the shoulder 120 of the bit 114. In some embodiments, the interlock depth 142 is a percentage of the shoulder height 144 in a range having an upper value, a lower value, or upper and lower values including any of 50%, 60%, 70%, 80%, 90%, 100%, greater than 100%, or any values therebetween. For example, the interlock depth 142 may be greater than 50% of the shoulder height 144. In other examples, the interlock depth 142 may be less than 100% of the shoulder height 144. In yet other examples, the interlock depth 142 may be between 50% and 100% of the shoulder height 144. In further examples, the interlock depth 142 may be between 60% and 90% of the shoulder height 144. In at least one example, the interlock depth 142 may be greater than 100% of the shoulder height 144.

While FIG. 7 illustrates an embodiment of a bit 114 with a planar top surface 140, other embodiments of a bit 114 have a non-planar top surface 140. For example, a bit 114 may have a top surface 140 that is convex, similar to a truss head on a bolt. In other examples, a top surface 140 may be concave, such that a portion of the top surface 140 is recessed toward the pin 118 of the bit 114. In at least one example, the top surface 140 may be frustoconical with a portion that is planar and a portion that is non-planar.

In some embodiments, the bit 114 has a generally conical pin 118 and substantially flat shoulder 120. In the same or other embodiments, a curved transition 146 may be positioned between the pin 118 and the adjacent shoulder 120 to direct workpiece material flow to the shoulder 120. In other embodiments, the bit 114 has a pin 118 and lacks a shoulder 120. In yet other embodiments, the pin 118 has a face 148 with one or more surface features thereon to engage with the workpiece material and increase flow of the workpiece material around the bit 114.

In some embodiments, a pin 118 includes one or more surface features to increase the movement of workpiece material during rotation of the pin 118. For example, a pin 118 may have a spiral surface feature to urge material in the stirred zone to circulate toward the radial center of the stirred zone instead of displacing radially away from the FBJ bit 114. Such a pin surface feature may be beneficial in a lap joint friction stir weld to reduce and/or prevent thinning of the workpiece material in the weld zone. The spiral pin surface feature in combination with the angle of a linear portion and/or curved portion of the pin profile, may circulate workpiece material downward toward within the stirred region, as well. Such a surface feature may be beneficial in a lap friction stir weld to encourage stirred workpiece material from the first workpiece toward the second workpiece to form the lap joint.

The pin 118 in FIG. 7 has a pin height 150 that is relative to the shoulder height 144. In some embodiments, the pin height 150 is a percentage of the shoulder height 144 in a range having an upper value, a lower value, or upper and lower values including any of 50%, 60%, 70%, 80%, 90%, 100%, 110%, 120%, 130%, 140%, 150%, greater than 150%, or any values therebetween. For example, the pin height 150 may be greater than 50% of the shoulder height 144. In other examples, the pin height 150 may be less than 150% of the shoulder height 144. In yet other examples, the pin height 150 may be between 50% and 150% of the shoulder height 144. In further examples, the pin height 150 may be between 75% and 125% of the shoulder height 144. In at least one example, the interlock depth 142 may be greater than 150% of the shoulder height 144.

In some embodiments, the pin 118 has a pin height 150 that is relative to a bit height 136. The pin height 150 may be in a range having an upper value, a lower value, or an upper and lower value including any of 5%, 10%, 15%, 20%, 25%, 30%, 40%, 45%, 50%, 60%, 70%, 80%, 90%, 100% of the bit height 136, or any values therebetween. For example, the pin height 150 may be greater than 10% of the bit height 136. In another example, the pin height 150 may be greater than 25% of the bit height 136. In yet another example, the pin height 150 may be greater than 50% of the bit height 136.

In some embodiments, the pin 118 has a pin height 150 in the longitudinal direction that is relative to a total diameter 154 of the bit 114. In FIG. 7, the total diameter 154 is a maximum diameter of the bit 114, or the diameter of the top surface 140. The pin height 150 may be in a range having an upper value, a lower value, or an upper and lower value including any of 5%, 10%, 15%, 20%, 25%, 30%, 40%, 45%, 50%, 60%, 70%, 80%, 90%, 100% of the total diameter 154, or any values therebetween. For example, the pin height 150 may be greater than 5% of the total diameter 154. In another example, the pin height 150 may be less than 100% of the total diameter 154. In yet another example, the pin height 150 may be between 10% and 50% of the total diameter 154. In at least one example, the pin height 150 may be between 15% and 35% of the total diameter 154.

In other embodiments, the bit 114 has a bit height 136 that is related to the total diameter 154. The bit height 136 may be in a range having an upper value, a lower value, or an upper and lower value including any of 5%, 10%, 15%, 20%, 25%, 30%, 40%, 45%, 50%, 60%, 70%, 80%, 90%, 100% of the total diameter 154, or any values therebetween. For example, the bit height 136 may be greater than 5% of the total diameter 154. In another example, the bit height 136 may be less than 100% of the total diameter 154. In yet another example, the bit height 136 may be between 10% and 50% of the total diameter 154. In a further example, the bit height 136 may be between 25% and 40% of the total diameter 154. In at least one specific example, the bit height 136 may be greater than 100% of the total diameter 154, such as when joining thick workpieces and/or the site of the FBJ placement has relatively small lateral clearance.

FIG. 7 illustrates a bit 114 with a tapered pin 118. In some embodiments, the pin 118 has a pin profile that is at least partially linear. In other embodiments, the pin 118 has a pin profile that is at least partially curved. In yet other embodiments, the pin 118 has a pin profile with a portion that is curved and a portion that is linear. For example, the embodiment of a pin 118 illustrated in FIG. 7 includes a pin profile with a curved transition 146 and a linear face 148.

The bit 114 may have a non-cutting tip 152 that allows the bit 114 to penetrate a workpiece by displacing workpiece material without cutting the workpiece material. In some embodiments, the bit 114 has a tip 152 that is rounded. In other embodiments, the tip 152 may be pointed. In yet other embodiments, the tip 152 is planar and the face 148 is optionally angled, such that the pin 118 is frustoconical. In further embodiments, the tip 152 is planar across a pin diameter 156, such that the pin 118 is substantially cylindrical. In at least one embodiment, the tip 152 includes at least one pilot feature to assist in engaging with and penetrating into the workpiece material.

In other embodiments, the tip 152 is a cutting tip that includes one or more cutting features to accelerate penetration into the workpiece material. The cutting features may cut a pilot hole with a diameter less than a pin diameter 156, such that the pin 118 displaces workpiece material radially outside the pilot hole. For example, the cutting features may cut a pilot hole with a diameter 50% of the pin diameter 156, and the face 148 of the pin 118 may displace workpiece material outside of the pilot hole.

In some embodiments, the pin 118 has a pin diameter 156 that is related to the total diameter 154 of the bit 114. For example, the pin diameter 156 may be a percentage of the total diameter 154 in a range having an upper value, a lower value, or an upper and lower value including any of 5%, 10%, 15%, 20%, 25%, 30%, 40%, 45%, 50%, 60%, 70%, 80%, 90%, 100%, or any values therebetween. For example, the pin diameter 156 may be greater than 5% of the total diameter 154. In another example, the pin diameter 156 may be less than 100% of the total diameter 154. In yet another example, the pin diameter 156 may be between 10% and 90% of the total diameter 154. In at least one example, the pin diameter 156 may be between 25% and 75% of the total diameter 154.

In some embodiments, the pin 118 has a face angle 158 between a face 148 of the pin 118 and the rotational axis 105 that is in a range having an upper value, a lower value, or upper and lower values including any of 30°, 40°, 45°, 50°, 60°, 75°, 80°, 85°, 90°, or any values therebetween. For example, a face 148 may be oriented at a face angle 158 greater than 30°. In other examples, the face 148 is oriented at a face angle 158 less than 90°. In yet other examples, the face 148 is oriented a face angle 158 between 30° and 90°. In further examples, the face 148 is oriented at a face angle 158 between 45° and 80°. In at least one example, the face 148 is oriented at a face angle 158 of 60° to the rotational axis 105. In at least another example, the face 148 is oriented at a face angle 158 that is non-perpendicular to the rotational axis 105.

Figure 8:
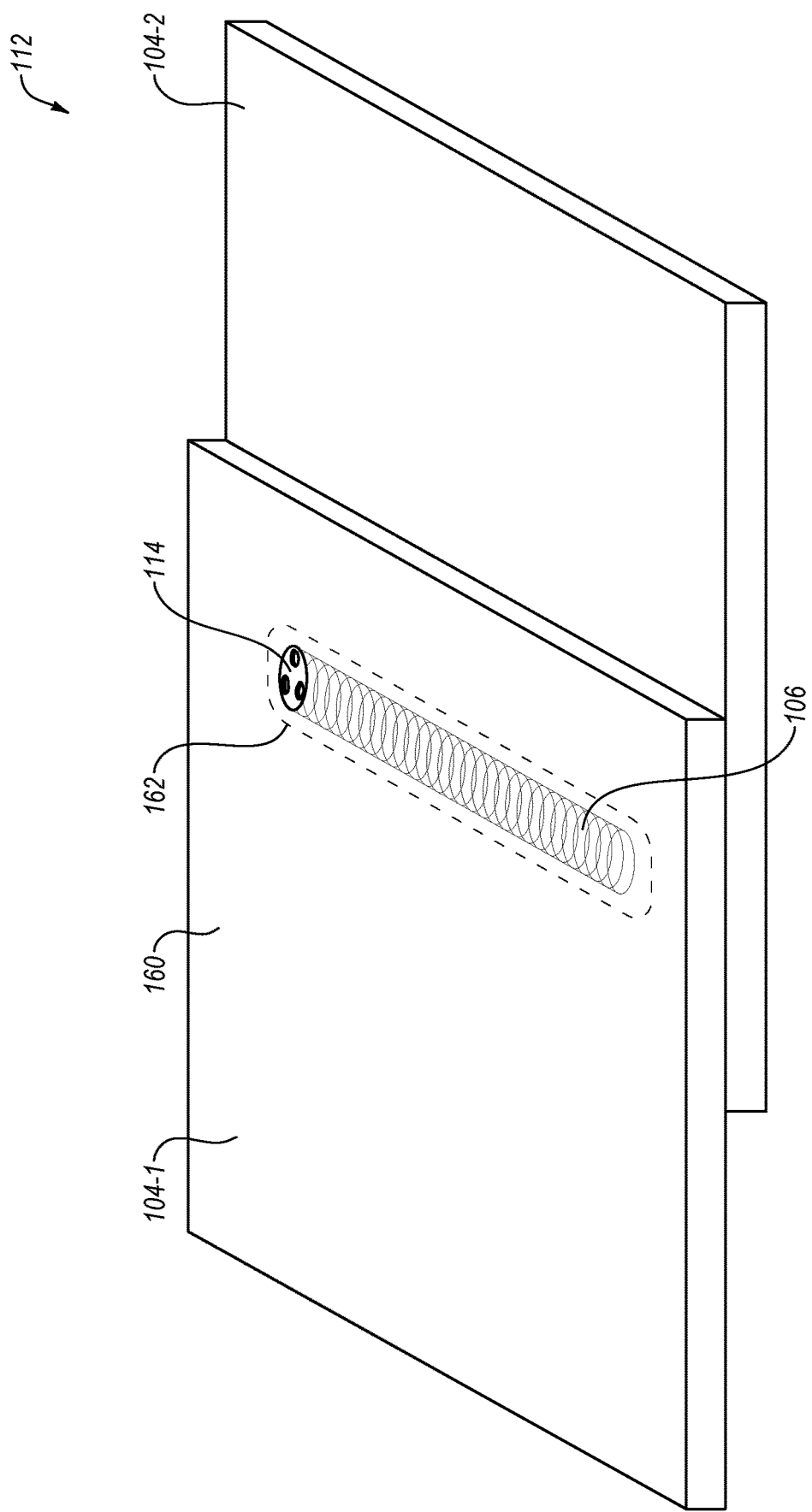
FIG. 8 is a perspective view of a friction bit joining joint, according to some embodiments of the present disclosure.

FIG. 8 is a perspective view of an embodiment of a lap joint 112 after welding a first workpiece 104-1 to a second workpiece 104-2 via FBJ. In some embodiments, a bit 114 is consumed in the lap joint 112. The bit 114 may be left in the lap joint 112 flush with a workpiece surface 160 such that the top surface 140, stirred zone 106, and the workpiece surface 160 are continuous and/or planar with one another.

In some embodiments, the bit 114 is considered flush with the workpiece surface even if a portion of the bit 114 protrudes from the workpiece surface 160. For example, the bit 114 may protrude from the workpiece surface 160 no more than 5.0 millimeters. In other examples, the bit 114 protrudes from the workpiece surface 160 no more than 3.0 mm. In yet other examples, the bit 114 protrudes from the workpiece surface 160 no more than 1.0 mm. In other embodiments, the top surface 140 of the bit 114 is recessed into the workpiece 104-1, 104-2 such that a portion of the top surface 140 is below the workpiece surface 160. For example, the top surface 140 may be recessed no more than 5.0 mm. In other examples, the top surface 140 is recessed no more than 3.0 mm. In yet other examples, the top surface 140 is recessed no more than 1.0 mm.

In some embodiments, the stirred zone 106 of the lap joint 112 includes a finished area 162, or is surrounded by the finished area 162. The finished area 162 may be the region of the lap joint contacted by the cutters and/or smoothing elements of the driver during the FBJ process. For example, the cutters, such as cutters 128 illustrated in FIG. 4, may be positioned radially outside of the bit 114 relative to a rotational axis of the FBJ tool. The cutters may, therefore, interact with the workpiece surface 160 radially outside of the stirred zone 106 generated by the contact of the bit 114. In some embodiments, the finished area 162 includes a cut surface where flash or other workpiece material displaced during the FBJ process is removed from the workpiece surface 160. In other embodiments, the finished area 162 includes a burnished surface that is burnished or otherwise smoothed by smoothing elements without cutting the workpiece material adjacent the stirred zone 106.

Figure 9:
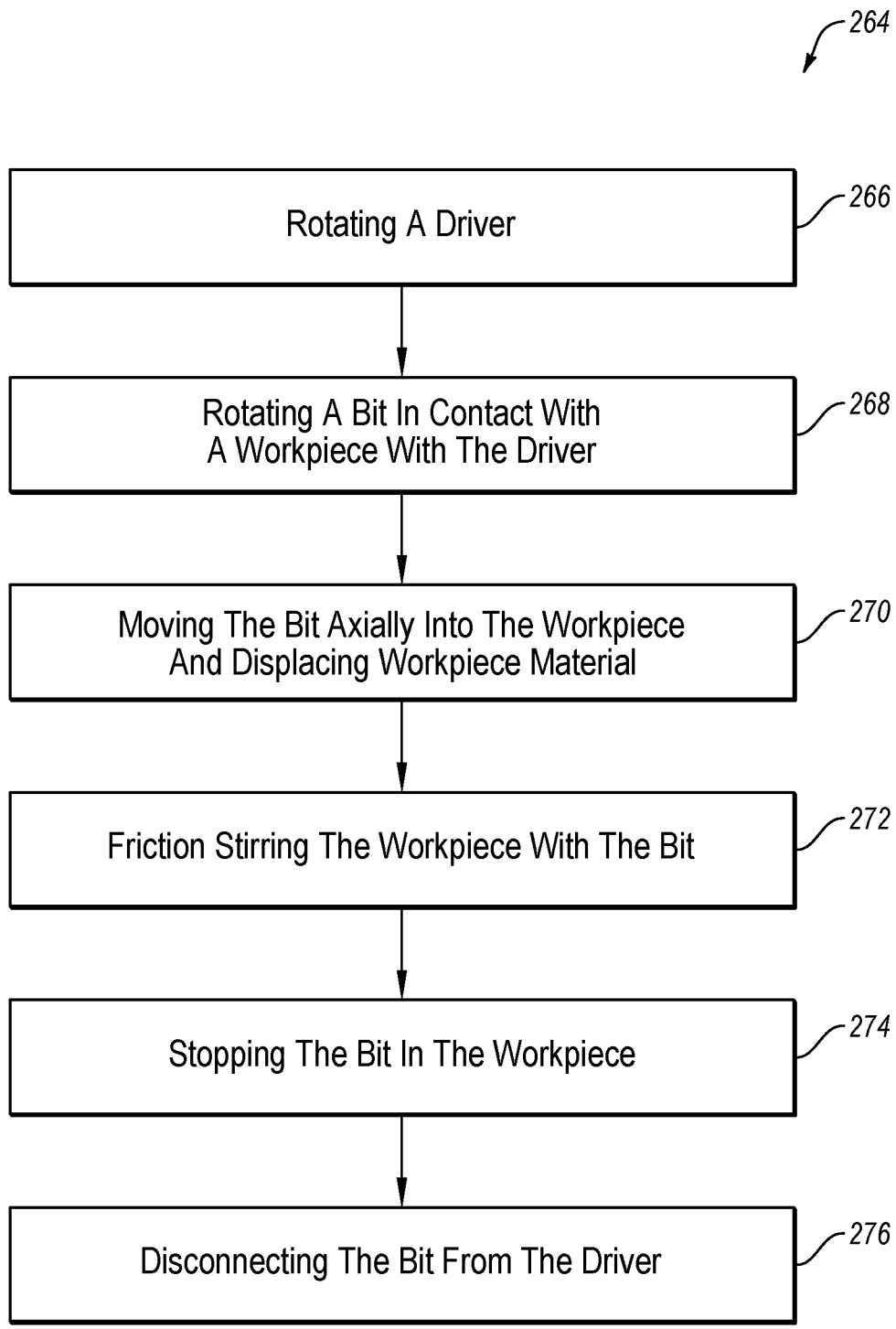
FIG. 9 is a flowchart illustrating a method of friction bit joining workpieces, according to some embodiments of the present disclosure.

FIG. 9 is a flowchart illustrating an embodiment of a method 264 of friction stirring a workpiece with a FBJ tool. The method 264 may include rotating a driver at 266 and rotating a bit with the driver in contact with a workpiece at 268. In some embodiments, the driver and bit rotate at a rotational speed in a range having an upper value, a lower value, or upper and lower values including any of 1 rpm, 50 rpm, 100 rpm, 1,000 rpm, 5,000 rpm, 10,000 rpm, 20,000 rpm, 40,000 rpm, 60,000 rpm, greater than 60,000 rpm, or any values therebetween. For example, the rotational speed of the driver and bit may be greater than 1 rpm. In other examples, the rotational speed of the driver and bit is less than 60,000 rpm. In yet other examples, the rotational speed is between 1 rpm and 60,000 rpm. In further examples, the rotational speed is between 50 rpm and 20,000 rpm. In at least one example, the rotational speed is between 100 rpm and 10,000 rpm.

In some embodiments, the method 264 further includes moving the bit axially into the workpiece and displacing workpiece material at 270. Plunging the bit into the workpiece may displace material before or after the rotation of the bit generates thermal energy. In some examples, the deformation of the workpiece material by the axial movement of the bit and the associated displacement of the workpiece material generates thermal energy to soften and/or plasticize the workpiece material for FBJ.

The method 264 may include friction stirring the workpiece with the bit at 272 and then stopping the bit in the workpiece at 274 to bond the bit to the workpiece material in the stirred zone. In some embodiments, friction stirring the workpiece includes removing flash from the workpiece as workpiece material is displaced by the bit. The flash may be removed by one or more cutters on the driver that rotate about a shared rotational axis withe the driver.

In some embodiments, the bit is stopped from the rotational speed of friction stirring in under 3.0 seconds. In other embodiments, the bit is stopped from the rotational speed of friction stirring in under 1.0 seconds. In yet other embodiments, the bit is stopped from the rotational speed of friction stirring in under 0.5 seconds. In further embodiments, the bit is stopped from the rotational speed of friction stirring in under 0.1 seconds.

In some embodiments, the method 264 includes disconnecting the bit from the driver at 276 after stopping the bit. For example, upon stopping the bit in the workpiece, the bit may become bonded to the workpiece material and moving the driver axially away from the workpiece may disconnect the driver from the bit. In some embodiments, disconnecting the bit from the driver includes exceeding a threshold force to disconnect the bit from the driver. In at least one embodiment, disconnecting the bit from the driver includes disabling an electromagnet in the driver to remove a magnetic force from the bit.

A FBJ system according to the present disclosure may allow the friction stirring of a workpiece with a consumable bit while increasing workpiece material flow by displacing workpiece material upon penetration of the bit. In at least one embodiment, a bit according to the present disclosure provides a flush surface with the workpiece surface without additional finishing steps after the FBJ process is completed.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, unless such features are mutually exclusive. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A tool for friction bit joining a workpiece material, the tool comprising:
a bit rotatable around a rotational axis, the bit having:
a pin having a frustoconical face and a face angle of greater than forty-five degrees between the frustoconical face and the rotational axis, the pin configured to friction stir the workpiece material and displace the workpiece material radially outward as the pin friction stirs the workpiece material;
a non-cutting tip protruding axially downward from the frustoconical face of the pin, the non-cutting tip having a maximum width perpendicular to the rotational axis;
a first curved transition between the non-cutting tip and the frustoconical face, wherein the first curved transition is curved along the rotational axis;
a top surface opposite the pin with at least one feature recessed in the top surface, the at least one feature configured to transmit torque to the bit to rotate the bit around the rotational axis;
a flat shoulder between the pin and the top surface, the flat shoulder configured to contain workpiece material displaced by the pin;
a cylindrical side surface of the pin extending upward from the frustoconical face;
a second curved transition between the cylindrical side surface of the pin and the flat shoulder, the second curved transition configured to direct workpiece material displaced by the pin toward the flat shoulder wherein the second curved transition is curved along the rotational axis;
the frustoconical face tapering from a maximum outer diameter thereof at the cylindrical side surface to a minimum outer diameter thereof at the first curved transition; and
the maximum width of the non-cutting tip is less than half of a difference between the maximum outer diameter and the minimum outer diameter of the frustoconical face of the pin.

2. The tool of claim 1, wherein the top surface of the bit includes an outer periphery; and
wherein the at least one feature is radially inward of the outer periphery of the top surface.

3. The tool of claim 1, the non-cutting tip including a flat lower surface and an axial side surface; and
wherein the face angle is less than ninety degrees.

4. The tool of claim 1, the face angle being less than ninety degrees.

5. The tool of claim 1, the face of the pin having one or more surface features configured to engage and flow workpiece material.

6. The tool of claim 1, the bit having a bit height that is between 10% and 50% of a total diameter of the bit.

7. The tool of claim 6, the bit having a pin height that is less than 50% of a total diameter of the bit.

8. The tool of claim 1, wherein the at least one feature comprises a plurality of recesses spaced radially outward from the rotational axis and angularly spaced from one another about the top surface.

9. A tool for friction bit joining, the tool comprising:
a bit and a driver for driving the bit into a workpiece;
the driver comprising:
a driver body rotatable around a rotational axis;
a lower seating surface of the driver body;
a cutter radially outward of the lower seating surface to remove excess material from the workpiece, the cutter having a cutting edge and a cutter surface extending upwardly from the cutting edge;
a tapered surface of the driver body adjacent the cutter surface and tapering radially outwardly as the tapered surface extends upwardly from the lower seating surface of the driver body, the tapered surface configured to direct material removed by the cutter away from the bit; and
at least one mechanical interlocking feature protruding from the lower seating surface of the driver body; and
the bit comprising a pin having a face and a face angle between the face and the rotational axis, the bit further including a non-cutting tip protruding axially from the face of the pin and a top surface opposite the pin, the top surface of the bit configured to seat against the lower seating surface of the driver body, the top surface including at least one recess in the top surface configured to transmit torque to the bit from the at least one mechanical interlocking feature to rotate the bit around the rotational axis;
wherein the pin is configured to friction stir a workpiece material;
wherein the bit includes a flat shoulder between the pin and the top surface; and
wherein the bit includes a curved transition between the pin and the flat shoulder, wherein the curved transition is curved along the rotational axis.

10. The tool of claim 9, wherein the cutter comprises a plurality of cutters radially outward of the lower seating surface.

11. The tool of claim 9, the cutting edge of the cutter being positioned axially even with the top surface of the bit.

12. The tool of claim 9, the driver further comprising a magnet in the driver body and configured to apply a magnetic force to the bit in an axial direction.

13. The tool of claim 12, the magnet being an electromagnet.

14. The tool of claim 9, the bit including a ferromagnetic material.

15. A tool for friction bit joining a workpiece material, the tool comprising:
a bit rotatable around a central rotational axis and including a ferrous material, the bit comprising:
a pin having a face and a face angle between the face and the rotational axis;
an axial side surface portion of the pin;
a non-cutting tip protruding axially from the face of the pin, the non-cutting tip including a lowermost end of the bit;
an uppermost, flat top surface of the bit opposite the pin;
a central portion of the uppermost, flat top surface of the bit intersected by the central rotational axis of the bit, the central portion of the uppermost, flat top surface including ferrous material configured to magnetically interact with a magnet of a driver;

a plurality of recesses in the uppermost, flat top surface of the bit to receive a plurality of drive protrusions of the driver, each of the recesses spaced radially outward from the central rotational axis of the bit so that the recesses are disposed about the central portion of the uppermost, flat top surface of the bit;

a flat shoulder between the pin and the top surface;

a lower, flat annular surface portion of the flat shoulder;

a curved transition connecting the axial side surface portion of the pin and the lower, flat annular surface portion of the flat shoulder, wherein the curved transition is curved along the rotational axis.

16. The tool of claim 15 wherein the non-cutting tip includes a flat lower surface and an axial side surface;

wherein the face angle is less than ninety degrees; and wherein the bit includes a lower curved transition between the face of the pin and the axial side surface of the non-cutting tip, wherein the lower curved transition is curved along the rotational axis.

17. The tool of claim 15 wherein the top surface of the bit includes an outer periphery; and wherein the plurality of recesses are radially inward of the outer periphery of the upper surface.

18. The tool of claim 15 wherein the face is frustoconical and the face angle is less than ninety degrees.

19. The tool of claim 15 wherein the plurality of recesses each include a flat extending downward from the uppermost, flat surface of the bit to be engaged by one of the drive protrusions of the driver.

20. The tool of claim 15 wherein the recesses are evenly angularly spaced about the central portion of the uppermost, flat top surface of the bit.

21. The tool of claim 15 wherein the recesses are non-circular.

* * * * *